(12) United States Patent
Turner et al.

(10) Patent No.: US 11,231,847 B2
(45) Date of Patent: Jan. 25, 2022

(54) DRAG AND DROP FOR A MULTI-WINDOW OPERATING SYSTEM

(71) Applicant: Apple Inc., Cupertino, CA (US)

(72) Inventors: Michael T. Turner, San Jose, CA (US); Cindy M. Barrett, Menlo Park, CA (US); Jason P. Ketterman, San Jose, CA (US); Patrick L. Coffman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/849,876

(22) Filed: Apr. 15, 2020

(65) Prior Publication Data

US 2020/0356230 A1 Nov. 12, 2020

Related U.S. Application Data

(60) Provisional application No. 62/844,078, filed on May 6, 2019, provisional application No. 62/855,896, filed on May 31, 2019.

(51) Int. Cl.
*G06F 3/0486* (2013.01)
*G06F 3/0488* (2013.01)
*G06F 3/0484* (2013.01)

(52) U.S. Cl.
CPC ........ *G06F 3/0486* (2013.01); *G06F 3/04842* (2013.01); *G06F 3/04845* (2013.01); *G06F 3/04886* (2013.01)

(58) Field of Classification Search
CPC ............... G06F 3/0486; G06F 3/04842; G06F 3/04845; G06F 3/04886
See application file for complete search history.

(56) References Cited

U.S. PATENT DOCUMENTS

| 8,516,384 | B1 * | 8/2013 | Torgerson | G06F 9/451 715/763 |
| 10,409,477 | B2 * | 9/2019 | Nilo | G06F 3/04842 |
| 10,437,408 | B2 * | 10/2019 | Jeong | G06F 3/0481 |
| 2003/0076362 | A1 * | 4/2003 | Terada | G09G 5/14 715/781 |
| 2007/0157101 | A1 * | 7/2007 | Indiran | G06F 3/0486 715/769 |
| 2008/0229224 | A1 * | 9/2008 | Kake | G06F 3/04817 715/769 |

(Continued)

*Primary Examiner* — Shen Shiau
(74) *Attorney, Agent, or Firm* — Morgan, Lewis & Bockius LLP

(57) ABSTRACT

A device implementing drag and drop for a multi-window operating system may include a processor configured to manage a drag session corresponding to a drag event, the drag event including an initial input selecting an item in a first application, a drag gesture moving the item to a particular region, and a release at an end of the drag gesture for dropping the item in the particular region. The processor is configured to send a request to commandeer the drag session to the drag and drop manager. The processor is configured to receive an indication that the release has occurred in the particular region. The processor is configured to perform a drop operation, where the drop operation includes at least one of opening a window of a second application for the item or opening another window of the first application for the item.

22 Claims, 10 Drawing Sheets

(56) References Cited

U.S. PATENT DOCUMENTS

| | | | |
|---|---|---|---|
| 2009/0228820 A1* | 9/2009 | Kim | G06F 3/04886 715/769 |
| 2010/0125806 A1* | 5/2010 | Igeta | G06F 3/0486 715/770 |
| 2014/0089833 A1* | 3/2014 | Hwang | G06F 3/0488 715/769 |
| 2015/0185980 A1* | 7/2015 | An | G06F 3/0486 715/803 |
| 2016/0062552 A1* | 3/2016 | Jeong | G06F 3/0488 715/788 |
| 2017/0357437 A1* | 12/2017 | Peterson | G06F 3/0486 |
| 2018/0335914 A1* | 11/2018 | Nilo | G06F 3/04817 |
| 2018/0335922 A1* | 11/2018 | Nilo | G06F 3/04845 |
| 2019/0346986 A1* | 11/2019 | Nilo | G06F 3/0488 |
| 2019/0377459 A1* | 12/2019 | Jeong | G06F 3/0481 |
| 2020/0326839 A1* | 10/2020 | Walkin | G06F 3/0486 |

* cited by examiner

DRAG AND DROP FOR A MULTI-WINDOW OPERATING SYSTEM

CROSS REFERENCE TO RELATED APPLICATIONS

This application claims the benefit of priority to U.S. Provisional Patent Application No. 62/844,078, entitled "Drag and Drop for a Multi-Window Operating System," and filed on May 6, 2019, and claims the benefit of priority to U.S. Provisional Patent Application No. 62/855,896, entitled "Drag and Drop for a Multi-Window Operating System," and filed on May 31, 2019, the disclosure of each of which is hereby incorporated herein in its entirety.

TECHNICAL FIELD

The present description relates generally to implementing drag and drop functionality on electronic devices.

BACKGROUND

Drop and drop gestures enable moving or copying data from a source application to a destination application. For example, a user may drag a representation of a photo from a first application and drop the representation of the photo into a second application. The data corresponding to the photo may then be copied or moved from the first application to the second application in response to the dropping.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

The subject system provides an architecture that enables drag and drop functionality for multi-window applications on electronic devices. In particular, the subject system enables a drag and drop operation within a same application which supports multiple windows (e.g., from a current window of the application into a newly opened window of the application), or between two respective applications with a destination application supporting multiple windows (e.g., from a first application into a newly opened window of the second application). In another example, the subject technology enables a given application to open an item when the item is dragged and dropped on a particular region of a screen. The subject technology also enables displaying a window for a corresponding selected user interface element.

Figure 1:
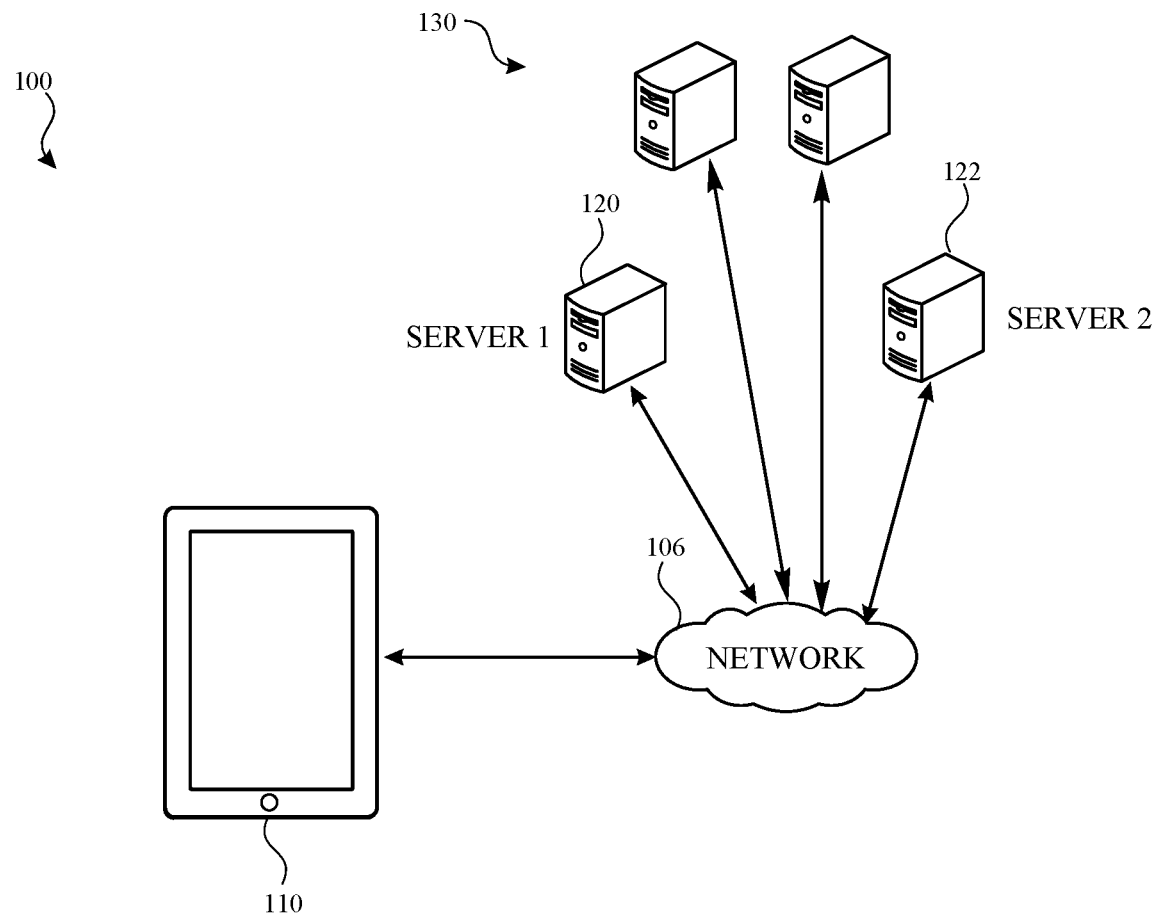
FIG. 1 illustrates an example network environment including an electronic device that may implement the subject system in accordance with one or more implementations.

FIG. 1 illustrates an example network environment 100 including an electronic device 110 that may implement the subject system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 110, a server 120, and a server 122 in which the server 120 and/or the server 122 may be included in a group of servers 130. The network 106 may communicatively (directly or indirectly) couple, for example, the electronic device 110 with the server 120 and/or the server 122 and/or the group of servers 130. In one or more implementations, the network 106 may be an interconnected network of devices that may include, or may be communicatively coupled to, the Internet. For explanatory purposes, the network environment 100 is illustrated in FIG. 1 as including the electronic device 110, the server 120, the server 122, and the group of servers 130; however, the network environment 100 may include any number of electronic devices and any number of servers or a data center including multiple servers.

The electronic device 110 may include a touchscreen and may be, for example, a portable computing device such as a laptop computer that includes a touchscreen, a smartphone that includes a touchscreen, a peripheral device that includes a touchscreen (e.g., a digital camera, headphones), a tablet device that includes a touchscreen, a wearable device that includes a touchscreen such as a watch, a band, and the like, any other appropriate device that includes, for example, a touchscreen, or any electronic device with a touchpad. In one or more implementations, the electronic device 110 may not include a touchscreen but may support touchscreen-like gestures, such as in a virtual reality or augmented reality environment. In one or more implementations, the electronic device 110 may include a touchpad. In FIG. 1, by way of example, the electronic device 110 is depicted as a tablet device with a touchscreen. In one or more implementations, the electronic device 110 may be, and/or may include all or part of, the electronic device discussed below with respect to the electronic system discussed below with respect to FIG. 10.

Further, the electronic device 110 may include a human interface device (HID). As referred to herein, a human interface device (HID) is type of computer device used by humans that takes input from humans and gives output to humans. Examples of a HID include, but not limited to, mouse, keyboards, trackpads, touchscreens, touchpads, electronic pencils or styluses, joysticks, speakers, microphones, webcams, cameras, motion sensors, headsets, etc. Although some examples described herein discuss touch inputs, it is appreciated that the described examples can be performed utilizing different inputs such as from a mouse, trackpad, touchpad, voice, etc., that may be utilized with any of the aforementioned HIDs.

The electronic device 110 may implement the subject system to provide drag and drop functionality via a human input device (HID), which described further herein. For example, the electronic device 110 may implement the example drag and drop architecture that is discussed further below with respect to FIG. 2. In one or more implementations, the electronic device 110 may support a drag and drop operation that involves dragging and dropping a representation of a data item that is physically stored on the electronic device 110, such as an image file, text, a document file, an email, a sound file, a video file, an application, etc. Other examples of data items as mentioned herein can include a document corresponding to a URL, a web browser tab, a calendar appointment, a reminder, a file, etc. Further, an item (or data item), as used herein, may refer to a file, content within a file, group of files, text, an application, or other object that includes data or a link to data (local or cloud based). Such an item may be selected as part of a drag and drop operation and included as part of an associated drag session. Additionally, each item (or data item) may be assigned its own unique item identifier that may be used to identify the item during a drag session. In an implementation, an item can be stored on a server instead of being physically stored on a given electronic device.

The server 120 and/or the server 122 may be part of a network of computers or the group of servers 130, such as in a cloud computing or data center implementation. The server 120, the server 122, and the group of servers 130 may store data, such as photos, music, text, documents, web pages and/or content provided therein, etc., that may be accessible on the electronic device 110. In one or more implementations, the electronic device 110 may support a drag and drop operation that involves dragging and dropping a representation of a data item that is physically stored on the server 120 or the server 122 or one or more servers from the group of servers 130, such as an image file, text, a document file, an email, a sound file, a video file, an application, etc. In one or more implementations, the electronic device 110 may implement the subject system without any network connectivity, e.g., independent of any server.

In one or more implementations, the electronic device 110 and/or the electronic 115 may be a device that does not have touchscreens such as a trackpad, mouse, or other types of input devices for drag and drop operations. In an example, drag and drop operations described herein can be performed by spoken commands or attention awareness features.

Figure 2:
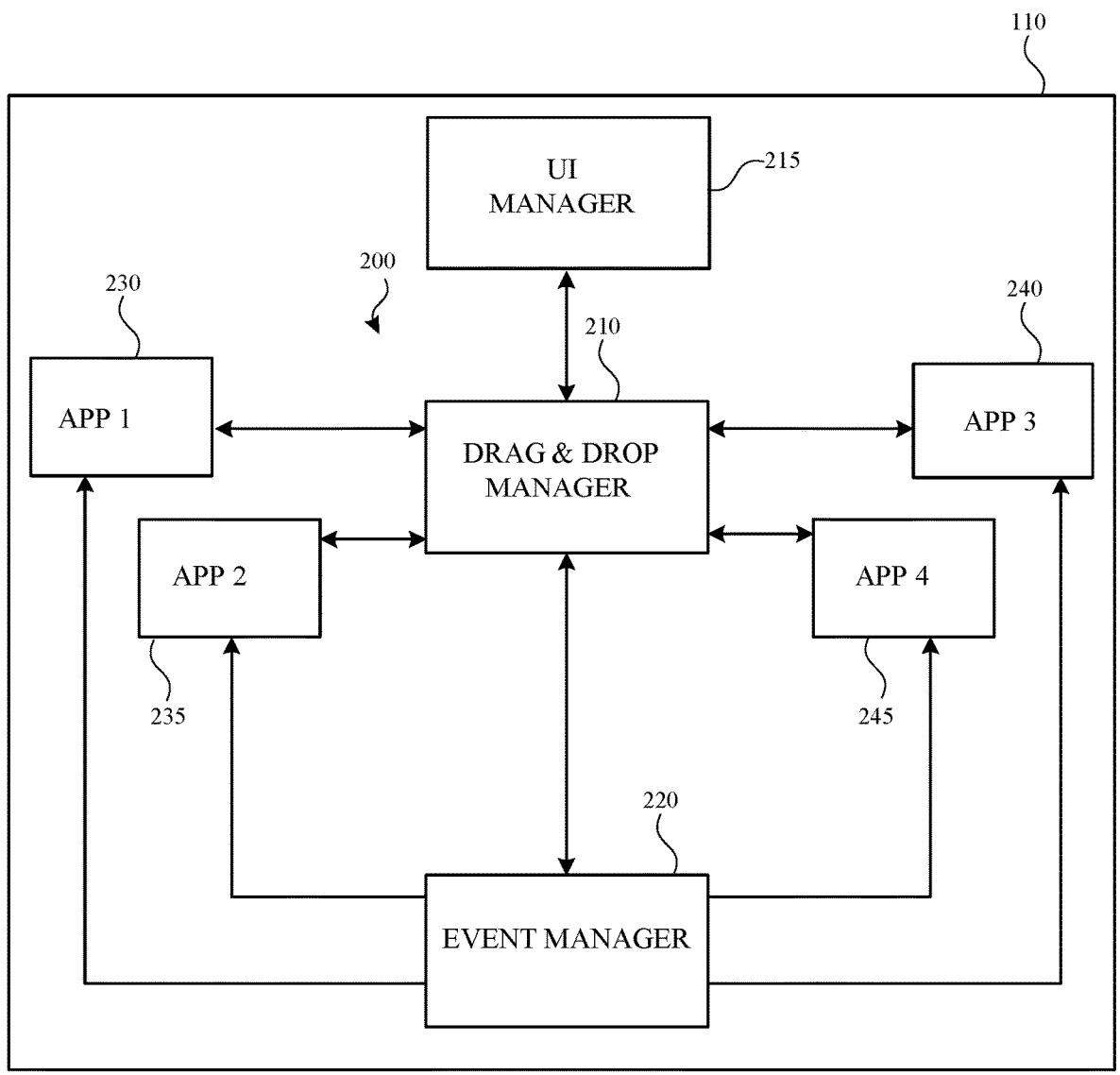
FIG. 2 illustrates an example drop and drop architecture that may be implemented on an electronic device in accordance with one or more implementations.

FIG. 2 illustrates an example drop and drop architecture 200 that may be implemented on an electronic device 110 in accordance with one or more implementations. For explanatory purposes, the drag and drop architecture 200 is described as being implemented by the electronic device 110 of FIG. 1, such as by a processor and/or memory of the electronic device 110; however, the drag and drop architecture 200 may be implemented by any other electronic device that includes and/or provides an HID for inputs. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The drag and drop architecture 200 includes a drag and drop manager 210 which is configured to manage a drag session corresponding to a drag event between an application 230 and an application 240. Multiple drag sessions are supported by the drag and drop architecture 200. In particular, the drag and drop manager 210 is configured to manage a separate drag session corresponding to a drag event between two respective applications (e.g., an application 235 and an application 245) and/or within a same application that supports multiple windows. For explanatory purposes, the discussion below references the drag session associated with the application 230 and the application 240; however, the discussion below can also apply with respect to the drag session associated with the application 235 and the application 245.

Moreover, as discussed further herein, when the drag session has been commandeered by a UI manager 215, the destination of a drop operation may be the UI manager 215 instead of another destination application (e.g., the application 240 or the application 245). For supporting applications that provide multiple windows, the UI manager 215 as described herein can function as a destination application for a given drop operation after commandeering a drag session. When the UI manager 215 is functioning as the destination application for a drop operation, the UI manager 215 can open/initiate an appropriate application for presenting the item being dragged (e.g., the default application for the item) and can pass the item being dragged into the newly opened/initiated application for display.

In one or more implementations, the UI manager 215 can facilitate a drop operation within the same application when a release at the end of a drag gesture occurs within the same application, or facilitate a drop operation within a different application when a drag gesture begins in a first application and a release occurs within a second different application.

Moreover, it understood that any of the aforementioned applications discussed herein may support multiple windows such that a drop operation from a given drag session can be performed with only a respective application, or performed between two respective applications.

In one or more implementations, the drag and drop manager 210 may be implemented as a user interface (UI) process, such as an application or daemon running on the electronic device 110 that has system-level privileges, includes a render context associated with the application that enables the application to draw or render over any user interface displayed on the display, and also allows the application to create drag sessions associated with drag events. In an example, the render context associated with the application (e.g., the drag and drop manager 210) is a transparent full-screen layer that sits on top of any user interface displayed on the display.

In one or more implementations, the drag and drop manager 210 manages drag item previews during the drag session. For example, while being dragged, a data item ("item") from a source application (e.g., stored on the electronic device 110 and/or on the server 120 or the server 122) may be provided as a preview corresponding to a graphical representation of the item. The graphical representation may be an image file, a video that is currently playing in an application (locally or streamed over the network 106), a sound file, etc. The representation may also be for an application, a data item, a file, group of files, etc.

In an example, depending on the type of item, the preview of the item may be a thumbnail image, a video clip, or any other appropriate graphical representation. As the item is being dragged from the source application into the destination application, the preview of the item presented in the destination application may be a different graphical representation than the preview in the source application. The drag and drop manager 210 may provide an animation that transitions or morphs the different representations as the item is being dragged from the source application over to the destination application and vice-verse. Further, each preview in the application 230 and/or the application 240 may be dynamically generated such that a preview transitions from a first type of graphical representation into a second type of graphical representation and so on while being presented within that application. In another example, the drag and drop manager 210 may not provide a preview for an item during a drag session, or only provide a preview when the item is dragged in the source application only or the destination only.

In an implementation, the drag and drop manager 210 may utilize a portal for providing the preview of the item in the application 240. A portal refers to a pixel-by-pixel reference to a GUI object specified by the application 230 that enables the drag and drop manager 210 to access and process the specified GUI object for providing the preview of the item in the application 240. A portal therefore is not a replication of the application's specified GUI object. Instead, a portal "points to" or "references" the application's GUI object, such as in a render tree. In an example, an image in a source application may be moved by the user during a drag session. The image may be a representation of a data item stored on the electronic device 110 and/or on the server 120 or the server 122, such as an image file, a video that is currently playing in an application (locally or streamed over the network 106), a sound file, etc. The representation may also be for an application, a data item, a file, group of files, etc. In an example, while being dragged, an item from a source application may be provided as a preview corresponding to a graphical representation of the item. For example, depending on the type of item, the preview of the item provided by a portal may be a thumbnail image, a video clip as it is playing, or any other appropriate graphical representation.

Although the above examples discuss the drag and drop manager 210 providing the preview of the item, in an implementation, when a drag session has been commandeered by the UI manager 215, the UI manager may perform the functionality of providing a preview of the item in a similar manner as the drag and drop manager 210 discussed above.

In an implementation, a drag event includes an initial HID input selecting an item in the application 230. The initial HID input may be a long touch or press gesture, or another HID input (e.g., mouse click, input from a touchpad, etc.), indicating the start of the drag event and initiating a creation of a new drag session for the drag event. The drag and drop manager 210 sends a request to the event manager 220 for creating a detached drag HID event. Such a detached drag HID event refers to specialized drag event that is copy of the current drag event where new drag HID events may be received. In response to the request, the event manager 220 can create the detached drag HID event and forward it to the drag and drop manager 210. Upon receipt of the detached drag HID event, the drag and drop manager 210 can indicate to the application 230 that the drag session has begun. The drag and drop manager 210 requests from the UI manager 215 for a routing policy, which determines where the event manager 220 forwards new drag HID events as detached drag HID events to one or more destinations indicated in the routing policy.

The UI manager 215, as described further herein, can be a system process or application that generally handles the UI of the system and manages graphical services (e.g., icon badges, dock, multitasking, and folders, etc.). The UI manager 215 manages a routing policy for receiving drag HID events and can commandeer a given drag session and disable hit testing of drag HID events for particular applications for that commandeered drag session. As further discussed herein, by commandeering the drag session, the UI manager 215 can be the recipient of a drop operation thereby acting, in effect, as a destination application. The UI manager 215 can determine how to handle the drop operation based at least in part on a type of data item (e.g., a URL) associated with the drag session and/or information related to user activity (e.g., where in the user interface that the user eventually performs a release). In an example, a user activity can be specified by the application (e.g., by the developer), and the UI manager 215 can perform an action (e.g., launch a new window, etc.) in response to a user activity with a particular user interface element (e.g., viewing a mail message in an email application) and when a representation of the user interface element is dragged to a particular region of the application, which is described further in FIG. 3 and FIG. 5. In another example, an item that is dragged in a drag session may be a URL link and depending on which region of the UI that the drop operation is performed, the UI manager 215 can perform a different action (e.g., as described in FIG. 3 and FIG. 5 below).

Upon receiving the request for the routing policy from the drag and drop manager 210, the UI manager 215 can send a response to the drag and drop manager 210 with the requested routing policy. In an example, the UI manager 215 can include information (e.g., a context ID corresponding to the UI manager 215) in the routing policy that indicates that the UI manager 215 is to be a recipient of new drag HID events corresponding to detached drag HID events. After receiving the routing policy with the aforementioned included information, the drag and drop manager 210 can send a request to the event manager 220 to update the existing routing policy for the drag session based on the received routing policy. As described further herein, the routing policy can including one or more context identifiers which correspond to different destinations for receiving drag HID events.

In an implementation, a drag event includes an initial HID input selecting an item (e.g., a URL, email, image, etc.) in the application 230. The initial HID input may be a long touch or press gesture, or another HID input (e.g., mouse click, touchpad input, etc.) indicating the start of the drag event and initiating a creation of a new drag session for the drag event. In at least an implementation, the application 230 (or any source application) only initiates a drag session through the drag and drop manager 210 and does not have a direct communication channel to the application 240 (or any destination application). The drag event also includes a drag gesture moving the item, and a release at an end of the drag gesture for dropping the item in the application 240 (or another destination). The drag session is assigned a drag session identifier, which is used in some instances as further explained herein to associate new drag HID events. An item (or data item), as used herein, may refer to a file, content within a file, group of files, text, an application, or other object that includes data or a link to data (local or cloud based). Such an item may be selected as part of a drag and drop operation and included as part of an associated drag session. Further, each item (or data item) may be assigned its own unique item identifier that may be used to identify the item during a drag session.

The drag and drop architecture 200 includes an event manager 220 that is configured to manage events when received through the drag and drop architecture 200. The event manager 220 may be implemented as a background process (e.g., daemon) executing on the electronic device 110 and is configured to receive all HID inputs coming into the subject system. The event manager 220, for example, can detect an initial HID input indicating a start of a drag event in a given source application (e.g., a long touch gesture in the application 230 or 235, or another HID input) and forward the HID input to the drag and drop manager 210 for processing and creating a new drag session and its associated drag session identifier. Upon detection of the long touch gesture or HID input associated with the initiation of the drag session, the event manager 220 may cancel (or forgo processing) other current HID inputs in the source application that are received. In an example, a hierarchy for HID inputs may prioritize the long touch gesture for initiating the drag session over other types of touch gestures that may be received during the drag session and the event manager 220 may delay the processing of these other touches until detection of a release that corresponds with dropping the item into the application 240. In another example, the hierarchy for HID inputs may prioritize a long touch or press gesture such that this gesture overrides another gesture.

The event manager 220 can receive a request from the drag and drop manager 210 to generate a copy of the drag event in the form of a specialized drag event, or a detached drag HID event, that coexists with the drag event. The specialized drag event is provided to the drag and drop manager 210, which is further configured to manage the specialized drag event and receive new drag HID events through the specialized drag event (e.g., corresponding to the new drag session). These new drag HID events may be associated with the drag session identifier of the drag session. In one or more implementations, the event manager 220 provides an interface that utilizes interprocess communication (IPC) for the drag and drop manager 210 to supply HID inputs associated with a particular drag session identifier.

During the drag session, when HID inputs are received that have been flagged with the drag session identifier, the event manager 220 is also configured to perform hit testing of the drag event to determine whether the application 240 (or any destination application) is configured and/or authorized to receive the item from the drag event. Hit testing, as mentioned herein, refers to an operation for determining whether a location of a current HID input on the user interface, as displayed by the electronic device 110 (or any electronic device), intersects a corresponding application on the screen. In at least an implementation, HID inputs are hit tested to determine a corresponding application as a potential destination application for performing a drop operation. However, as discussed further herein, when the UI manager 215 has commandeered a given drag session, hit testing may be disabled for one or more applications or destinations (e.g., by updating the routing policy for the drag session).

In an implementation, the aforementioned hit testing may be rate limited to mitigate potential performance issues to the drag and drop architecture 200 and/or the electronic device 110. In an implementation, the event manager 220 may determine, based on the drag session identifier, respective locations of all HID inputs for the drag session, compute a centroid of the locations of the HID inputs, and perform hit testing on the location of the centroid to determine a potential destination application for a dropped item.

In one or more implementations, the event manager 220 associates a new unique identifier with a path of a given drag event and verifies that newly received HID inputs that are part of the drag event match existing HID inputs known to the event manager 220 using the new unique identifier. During the drag session, the event manager 220 may forward HID inputs flagged with the drag session identifier to the drag and drop manager 210, the UI manager 215, the application 230, the application 240, and/or any other application. In one or more implementations, when receiving a HID input associated with the drag session identifier, the application 240 requests an XPC connection (e.g., a type of interprocess communication mechanism with sandbox features) with the drag and drop manager 210. The XPC connection may provide a sandbox environment, limiting the type of accessible information, for the application 240 to communicate with the drag and drop manager 210. For example, the drag and drop manager 210 will not release any data regarding one or more representations of the item until the drag event has ended.

In an implementation, upon a release by the user's finger at the end of drag gesture (indicating the end of the drag event), the event manager 220 notifies the drag and drop manager 210 and the destination application (e.g., the application 240). However, when the UI manager 215 has commandeered the drag session, the event manager 220 may instead notify the drag and drop manager 210 and UI manager 215.

Using the event manager 220 to deliver events to the drag and drop manager 210 and the application 240 (or any destination application) advantageously enables the drag and drop manager 210 and the application 240 (or any destination application) to receive events with minimal latency (e.g., at effectively the same time). Further, synchronization with other events received by the application 240 (or any destination application) is provided to enable the application 240 to behave normally for any additional HID inputs that are not part of the drag event.

The drag and drop manager 210 may be configured to notify the application 240 that the drag event has ended and that the item may be dropped into the application 240, if accepted for receipt by the application 240. In one or more implementations, the application 240 may indicate to the drag and drop manager 210 that it wishes to receive the dropped item. For example, the drag and drop manager 210 may receive a request from the application 240 for information corresponding to the item associated with the drag event. The request may include, for example, the drag session identifier. However, when the drag session has been commandeered by the UI manager 215, the UI manager 215 may indicate to the drag and drop manager 210 that it wishes to receive the dropped item.

The drag and drop manager 210 may request additional information regarding the item from the application 230 (or another source application), such as a list of available representations of the item. For example, each representation may be a different digital version of the item and the list may be sorted in an order of fidelity or level of quality. The drag and drop manager 210 may receive the additional information corresponding to the item from the application 230 and may provide the additional information corresponding to the item to the application 240. The application 240 (or another destination application) can then utilize the received additional information to request the drag and drop manager 210 to initiate a data transfer for a particular representation of the item for completing the drop operation. However, when the drag session has been commandeered by the UI manager 215, the UI manager 215 may indicate to the drag and drop manager 210 that it wishes to receive the dropped item and request further information (e.g., the representations) for the dropped item from the application 230 (or another source application corresponding to the drag session). The UI manager 215 can request the drag and drop manager 210 to initiate a data transfer for a particular representation of the item for completing the drop operation, such as by initiating an application and providing the particular representation of the item to the application for display.

In an implementation, the drag and drop manager 210 controls the flow of information to any destination application, and any request by the destination application (e.g., a given destination application or the UI manager 215 acting as the destination application) may not be fulfilled until the drag and drop manager 210 has determined that the request should be allowed.

Figure 3:
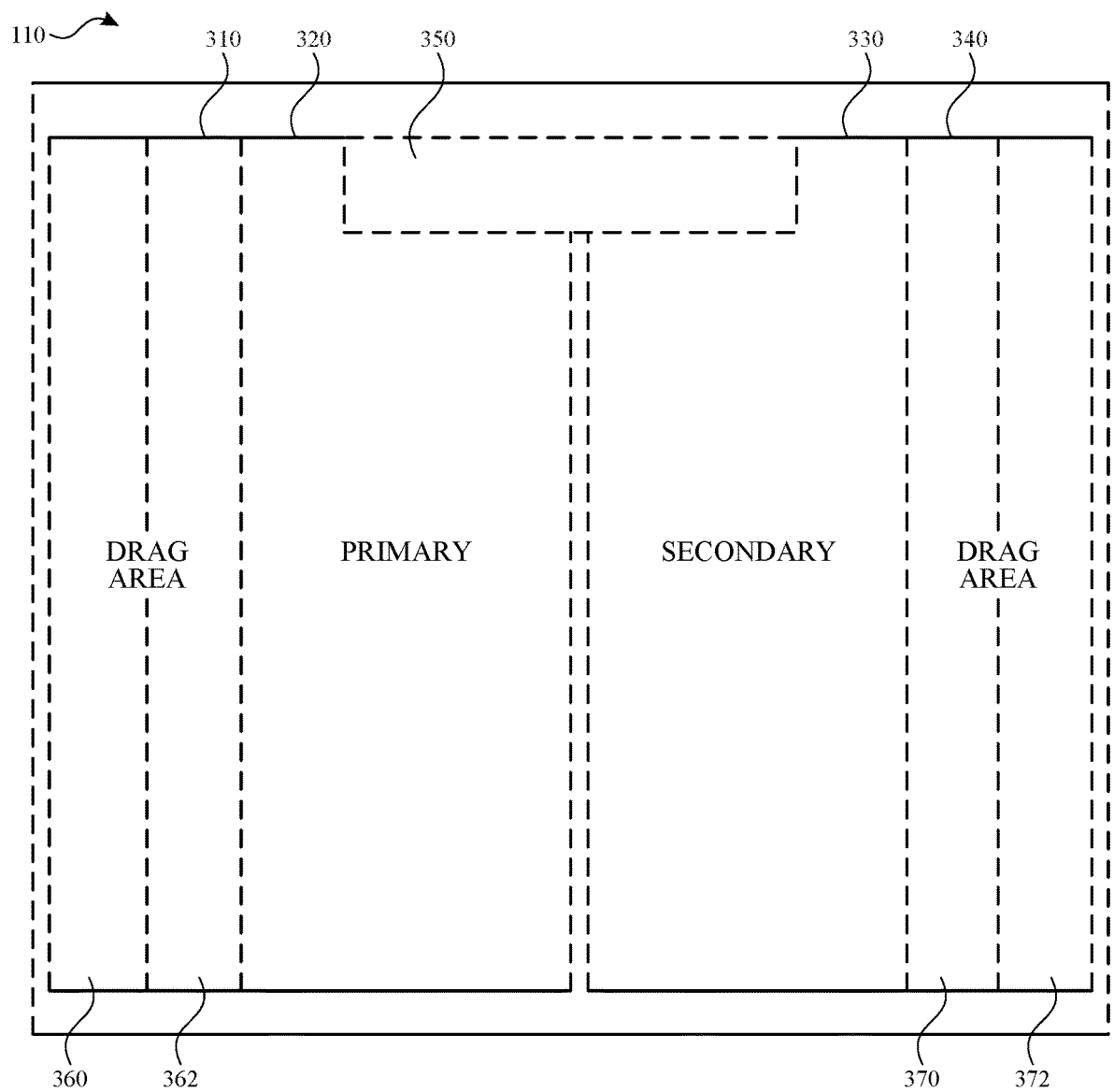
FIG. 3 illustrates different regions of respective user interfaces for performing drag and drop operations in accordance with one or more implementations of the subject technology.

FIG. 3 illustrates different regions of respective user interfaces for performing a drag and drop operations in accordance with one or more implementations of the subject technology.

As illustrated in FIG. 3, respective user interfaces of two applications are displayed on a screen of a given electronic device (e.g., the electronic device 110). For example, a drag area 310 and a primary area 320 are included in a user interface of a first application (e.g., the application 230), and a drag area 340 and a secondary area 330 are included in user interface of a second application (e.g., the application 240).

In an implementation, the subject technology can receive input in a particular region of the user interface and enable certain actions to occur such as in response to receiving input in such a region of the user interface, the subject system can perform an action such as opening a window (or some other action). In an example, the subject system can designate various user interface elements that can be commandeered by the system when recognized (e.g., based on information in a database or table) and perform a predefined action for the corresponding user interface element(s).

In the example of FIG. 3, there are particular regions of the aforementioned respective user interfaces where the subject system can take over (e.g., commandeer) a drag session and use the drag session to open a system space. In an example, opening a system space can include: 1) launching a new app (e.g., an application that is not open or currently running on the electronic device 110), 2) opening an existing app (e.g., an application that is currently running on the electronic device 110), 3) or creating a new window for an existing app (e.g., a new window in an application that is currently running on the electronic device 110).

As further shown in FIG. 3, in an implementation, a full screen region 350 is provided in a portion of the drag area 340. When an input (e.g., drag HID event) is received in the full screen region, the subject system can display an item dragged into the full screen region 350 in a full screen mode of the electronic device 110. A split view region 372 is provided to display an item in a split screen mode when the item is dragged into the split view region 372. A floating application region 370 is provided to display an item as a floating panel or window when the item is dragged into the floating application region 370.

Additionally, a split screen region 360 and a floating application region 362 are provided in respective portions of the drag area 310 that respectively provide similar functionality to the split view region 372 and the floating application region 370 described above.

The following discussion relates to a drag session where the user performs a drag gesture into a respective drag area, then after some hysteresis (e.g., making a user interface lag behind user input events or other events), the system may choose to take over the drag session.

Figure 4:
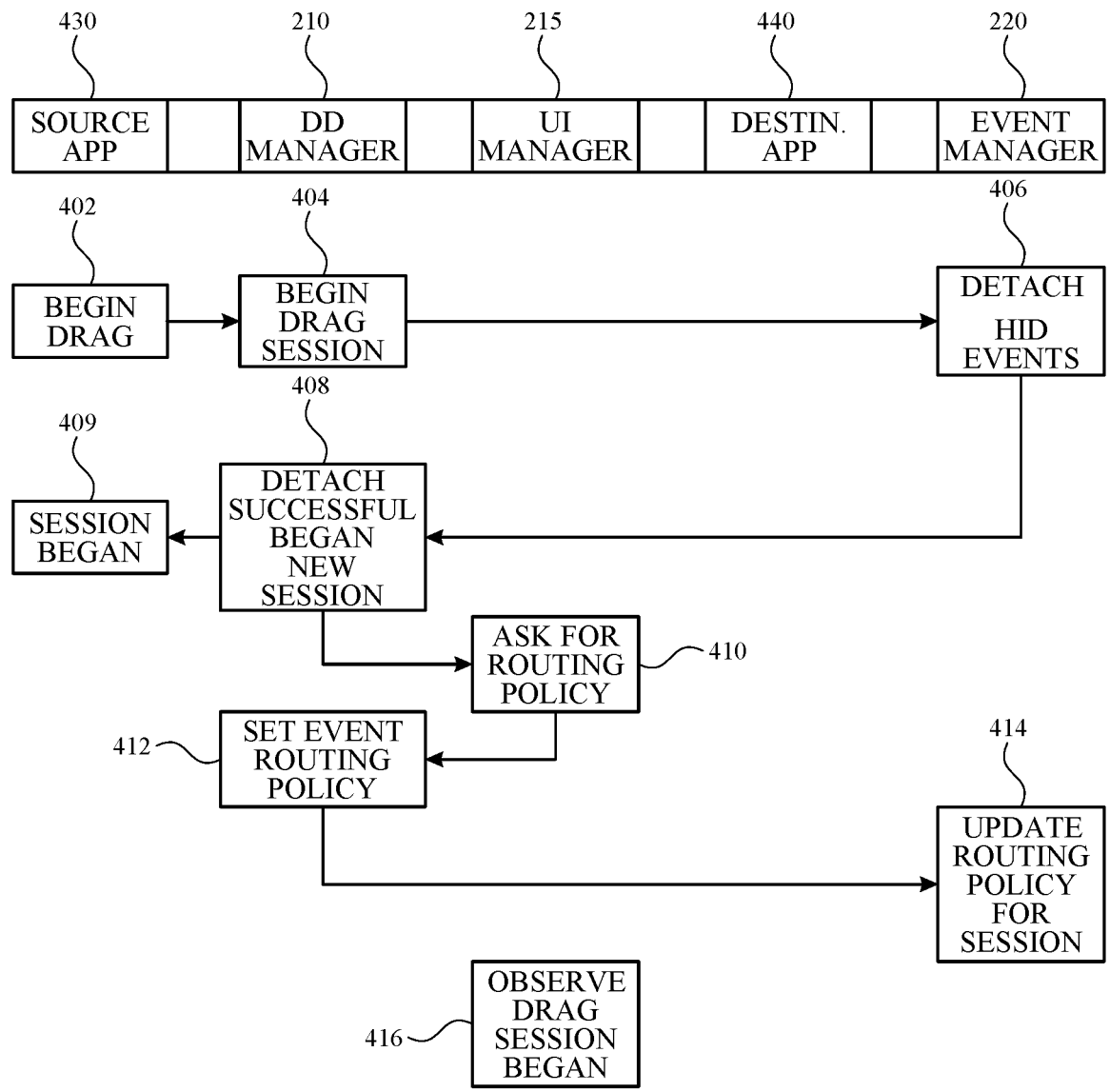
FIG. 4 illustrates an example of a communication flow between system components for initiating a drag operation in accordance with one or more implementations of the subject technology.

FIG. 4 illustrates an example of a communication flow between system components for initiating a drag operation in accordance with one or more implementations of the subject technology. As discussed further below, FIG. 4 includes respective blocks corresponding to particular operations that are performed by various components of the subject system described in FIG. 2 that are provided on a given electronic device such as the electronic device 110.

In the example of FIG. 4, the communication flow starts in a source application 430 after receiving a drag event in the source application 430 in block 402. As discussed before, the event manager 220 can detect an initial HID input indicating a start of a drag event in the source application 430 at block 402 and forward the HID input to the drag and drop manager 210 for processing. The drag and drop manager 210 can begin a drag session in block 404. The drag and drop manager 210 detaches the HID inputs from the event manager 220. As mentioned before detaching HID inputs can be performed by the event manager 220 generating a copy of the drag event in the form of a specialized drag event in block 406, or a detached drag HID event corresponding to human interface device (HID) events, that coexists with the drag event, which is then provided to the drag and drop manager 210. Examples of a HID include, but not limited to, mouse, keyboards, trackpads, joysticks, speakers, webcams, headsets, etc. The drag and drop manager 210 creates a new drag session and its associated drag session identifier at block 408, which indicates the beginning of the new drag session at block 409.

The drag and drop manager 210 requests the UI manager 215 for a routing policy for this drag session which is received by the UI manager 215 in block 410. A routing policy as mentioned herein refers to information indicating where components of the system route the drag events that are generated when HID inputs are detached. The UI manager 215 can respond with information regarding the routing policy and include metadata such as identifying the source application and/or whether or not the source application is eligible for a system takeover (e.g., commandeering as discussed further herein). By responding, the UI manager 215 indicates that it wishes to register an additional context identifier (ID) for receiving information related to drag events. In this manner, this additional context ID corresponds to an additional destination that, in an example, the event manager 220 will send information related to drag events. In an example, the additional context ID corresponds to the UI manager 215, but it is appreciated that any context ID may be utilized corresponding to another destination. The drag and drop manager 210 sets the routing policy based on the response received from the UI manager 215 (e.g., that at least includes the additional context ID) in block 412. The drag and drop manager 210 then sends an indication (e.g., message) to the event manager 220 to update the routing policy. The event manager 220 updates the routing policy for the session in block 414. The UI manager 215 receives an observation that the drag session has begun in block 416.

In an implementation, a routing policy may include the following information: two different sets of context IDs and a flag. A first set is a set of context IDs indicates one or more destinations (e.g., applications) that receive drag event information (e.g., sent from the event manager 220). A second set of context IDs indicates one or more destinations (e.g., applications) to exclude from hit testing. Additionally, a flag is included in the routing policy that indicates whether hit testing is enabled or not.

The source application 430 and the destination application 440 can be any application on a given electronic device (e.g., the electronic device 110). In an example, the source application 430 and the destination application 440 can be the same application in which a drag and drop operation initiates and ends in the same application.

Figure 5:
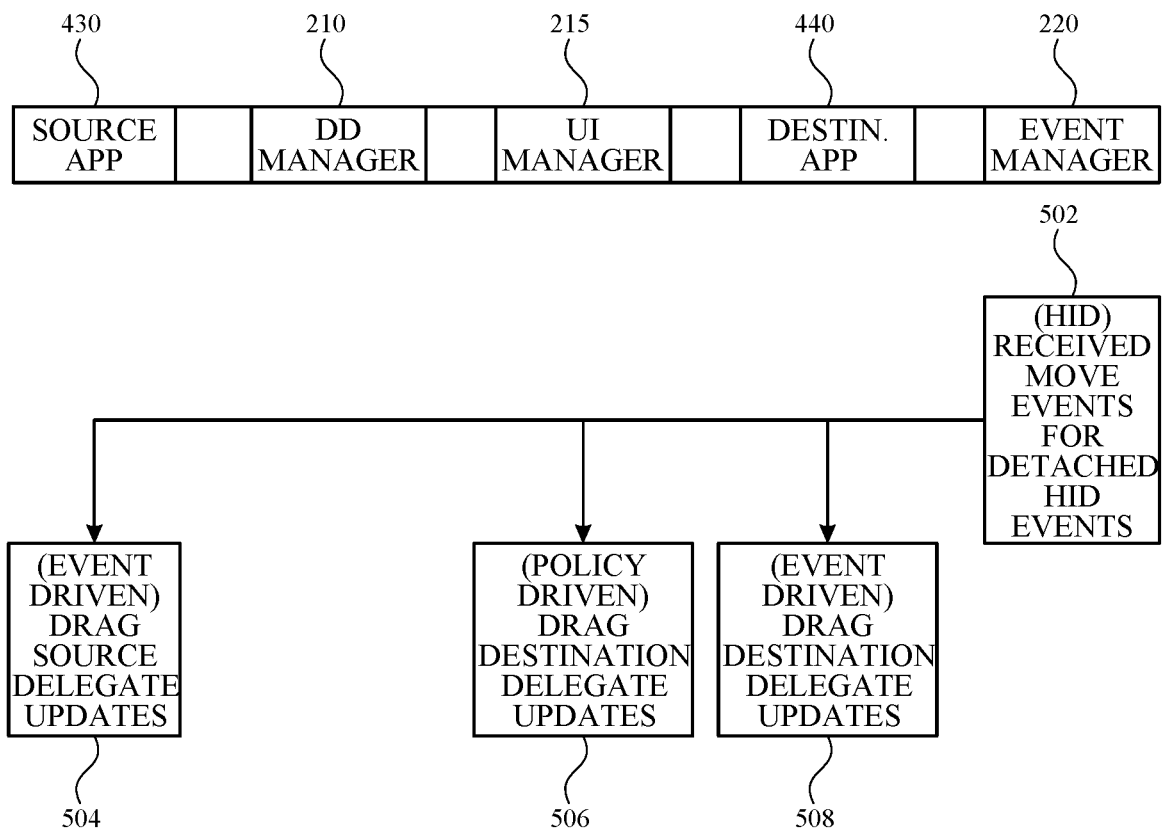
FIG. 5 illustrates an example of a drag session update in accordance with one or more implementations of the subject technology.

FIG. 5 illustrates an example of a drag session update using a given routing policy in accordance with one or more implementations of the subject technology. As discussed further below, FIG. 5 includes respective blocks corresponding to particular operations that are performed by various components of the subject system described in FIG. 2 that are provided on a given electronic device such as the electronic device 110.

In the example of FIG. 5, the communication flow starts in the event manager 220 receives drag events which will be forwarded as detached drag human interface device (HID) events to respective destinations at block 502. As illustrated, a human interface device (HID) can provide the aforementioned drag events. Based on a given routing policy, the event manager forwards the detached drag HID events to the source application 430 in block 504 and the destination application 440 in block 508. Further, based on the routing policy, the detached drag HID events are forwarded to a particular destination based on a given context ID in the routing policy. In this example, the context ID corresponds to the UI manager 215 and the event manager 220 forwards the detached drag HID events to the UI manager 215 in block 506. In block 506, in an implementation, the UI manager 215 performs a lookup (e.g., into a database or registry of information) to determine whether the detached drag HID events correspond to a user activity or a type of item that the UI manager 215 would perform a particular action (e.g., open a new window, etc.). As discussed before, a user activity can be specified by the application (e.g., by the developer), and the UI manager 215 can perform an action (e.g., launch a new window, etc.) in response to a user activity with a particular user interface element (e.g., viewing a mail message in an email application) and when a representation of the user interface element is dragged to a particular region of the application. In another example, an item that is dragged in a drag session may be a URL link and depending on which region of the UI that the drop operation is performed, the UI manager 215 can perform a different action such as opening a new tab window to open the URL link, etc.

Figure 6:
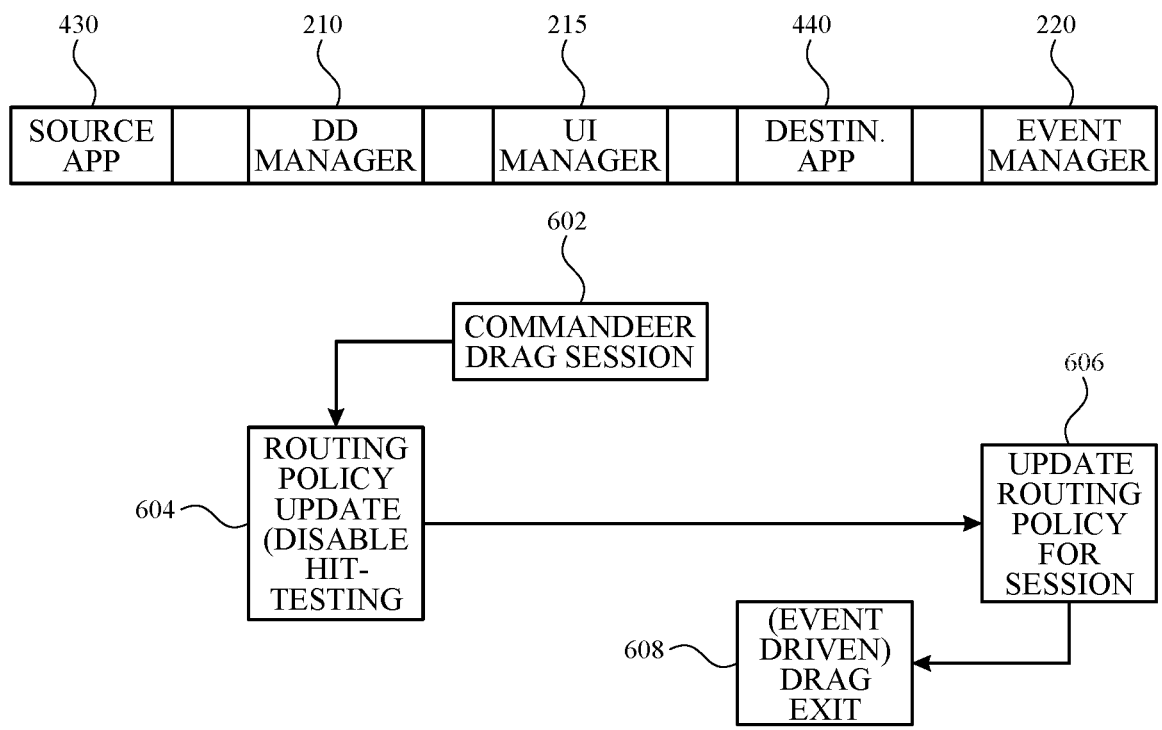
FIG. 6 illustrates an example of commandeering a drag session in accordance with one or more implementations of the subject technology.

FIG. 6 illustrates an example of commandeering a drag session in accordance with one or more implementations of the subject technology. As discussed further below, FIG. 6 includes respective blocks corresponding to particular operations that are performed by various components of the subject system described in FIG. 2 that are provided on a given electronic device such as the electronic device 110.

In an example, commandeering a drag session by the UI manager 215 can occur when a drag event moves into a region of interest (e.g., the drag area 310 or the drag area 340). In an implementation, commandeering a drag session via the UI manager 215 may be accomplished by setting a commandeered property to "YES" in the drag session which occurs in block 602. Setting this property results in non-policy driven destinations receiving an indication of a drag exit, which further results in disabling hit testing in the routing policy by the drag and drop manager as shown in block 604. The drag and drop manager 210 sends a message to the event manager 220, which updates the routing policy for the session in response to the message as shown in block 606. Next, the event manager 220 sends an indication of a drag exit to the destination application 440 in block 608, which has an effect of disabling hit testing for the destination application 440 during the drag session.

Figure 7:
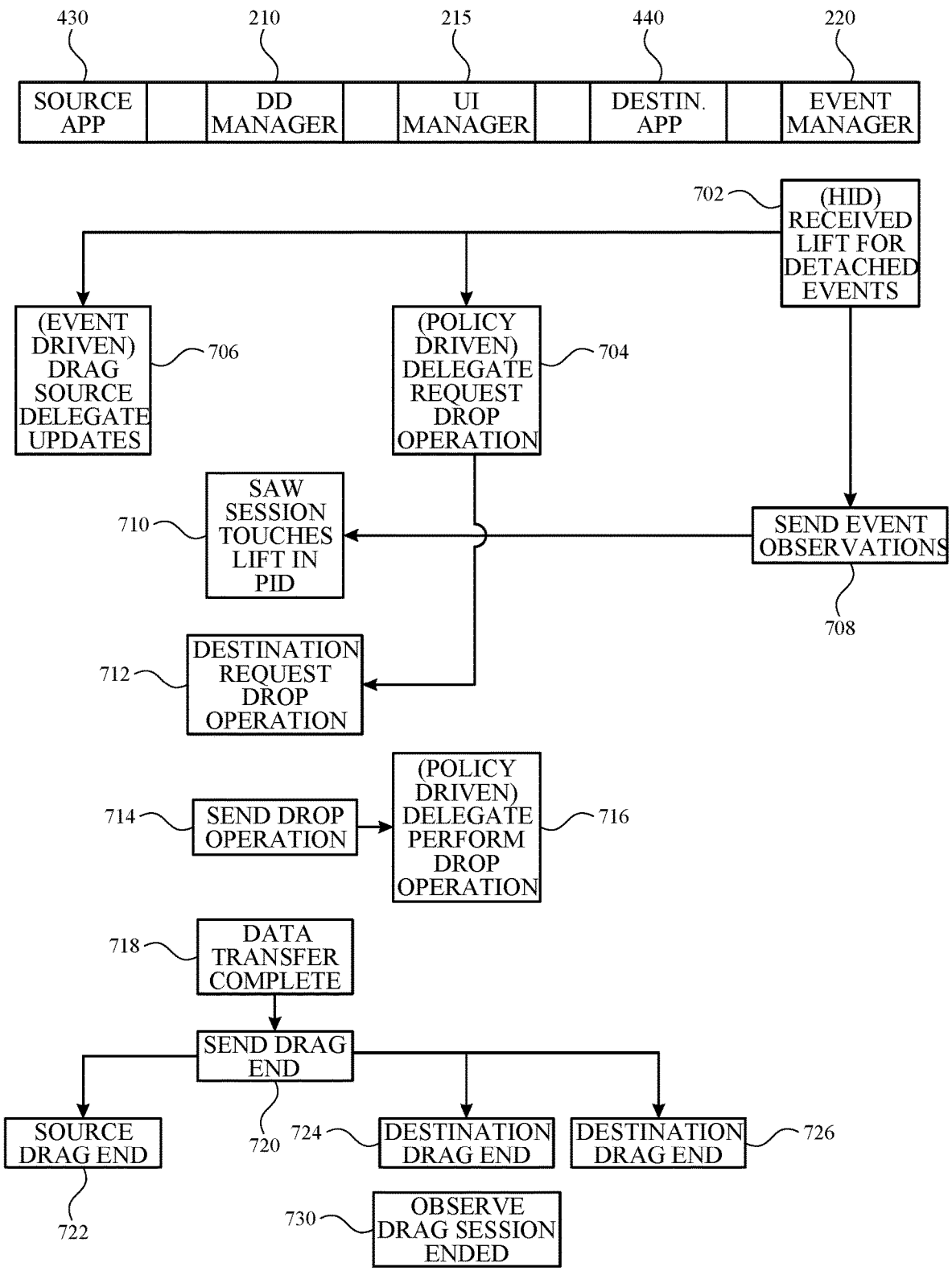
FIG. 7 illustrates an example of a drop operation for a commandeered drag session in accordance with one or more implementations of the subject technology.

FIG. 7 illustrates an example of a drop operation for a commandeered drag session in accordance with one or more implementations of the subject technology.

In the example of FIG. 7, a communication flow for completing a current drag session after being commandeered by the UI manager 215 (e.g., commandeered drag session completion) is illustrated. The event manager 220 receives an indication of an event for a drop operation (e.g., a lifting of the user's finger from the touchscreen of the electronic device 110 corresponding to a release indicating the end of the drag event, or another HID input that indicates a release) for the detached HID events in block 702. The event manager 220 forwards the event indicating the drop operation to the UI manager 215 and the source application 430 at block 704 and block 706.

The event manager 220 sends HID event observations to the drag and drop manager 210 in block 708. The drag and drop manager 210 may check a process identifier (ID) of the destination application to ensure that the release associated with the drag event of the drag session corresponds to the expected destination application (e.g., the destination application 440) in block 710. In an implementation, block 710 corresponds to when the drag event is ending. The UI manager 215 sends a request for completing a drop operation to the drag and drop manager 210 in block 712. In an implementation, the UI manager 215 makes a request for a representation of an item that is being dragged. For example, the source application 430 may be able to provide multiple representations of the item in varying degrees of fidelity or quality (e.g., original image, PDF, PNG, JPG, plain text, etc.).

In response, the drag and drop manager 210 sends, to the UI manager 215, the request for the representation of the item in block 714. In an implementation, the drag and drop manager 210 initiates a data transfer of the representation of the item from the source application to the UI manager in block 716 and determines that the data transfer of the representation of the item is completed in block 718. In this manner, the drop operation completes as if the system client (e.g., the UI manager 215) was a normal destination for the drop operation.

As further illustrated, the drag and drop manager 210 sends a message indication that the drag session has ended in block 720 to the source application 430, the UI manager 215, and the destination application 440 which receives the message in block 722, block 724, and block 726. A new drag ended observation (e.g., notification) is called on the UI manager 215 in block 730.

Figure 8:
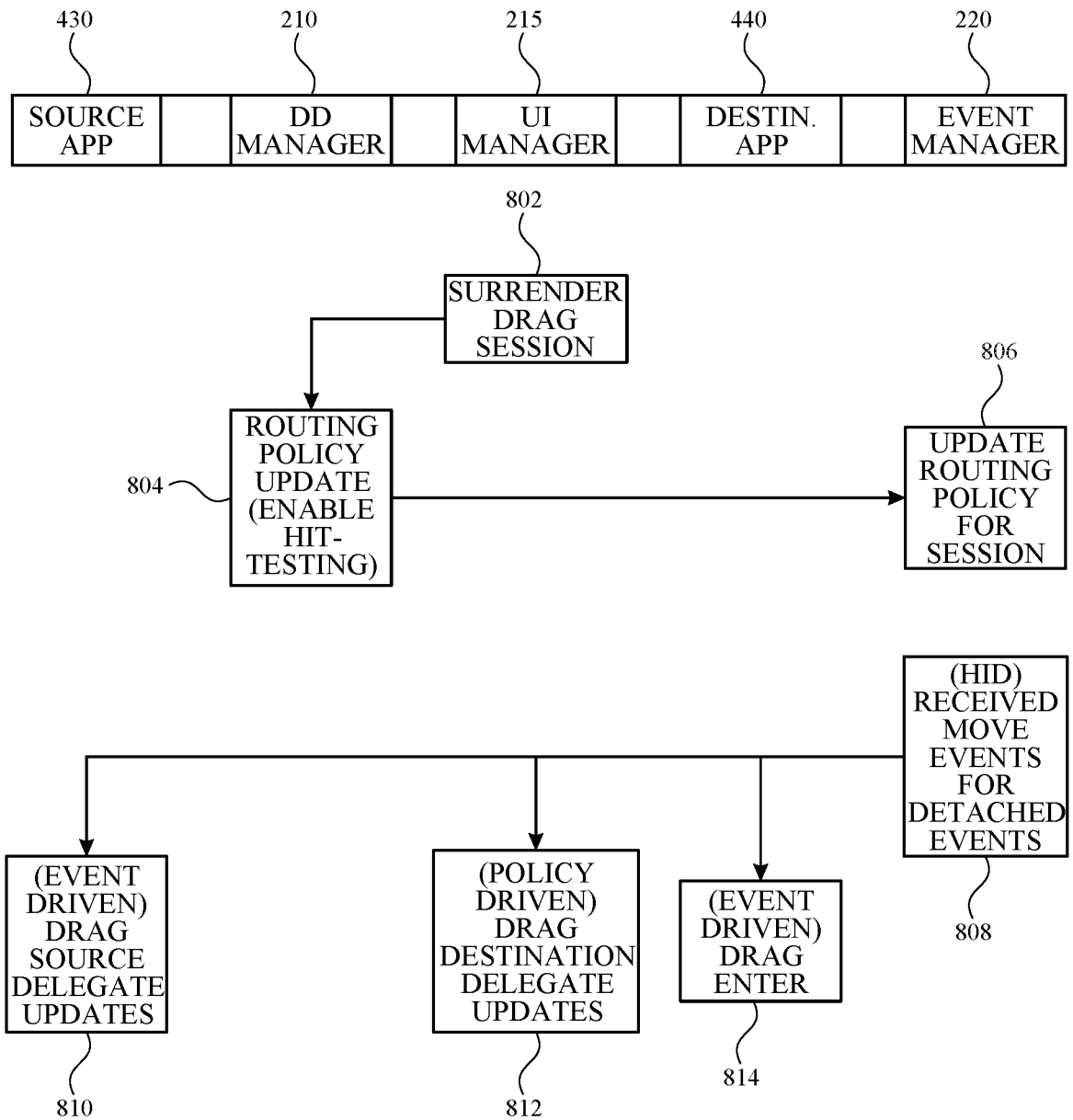
FIG. 8 illustrates an example of surrendering drag session in accordance with one or more implementations of the subject technology.

FIG. 8 illustrates an example of surrendering drag session in accordance with one or more implementations of the subject technology.

The example of FIG. 8 shows a communication flow for surrendering a drag session via the system interface (e.g., the UI manager 215). As referred to herein, surrendering a drag session occurs when the UI manager 215 returns control to the drag and drop manager 210 as described further below. In an example, if the user provides drag HID inputs that are outside of the drag areas of interest (e.g., the drag area 310 and/or the drag area 340), the UI manager 215 may decide to relinquish (e.g., surrender) the drag session back to the drag and drop manager 210. When this occurs, hit-testing for destinations can return to normal operation. Further, a given policy driven destination (e.g., a particular application) may no longer be in control of the drag session or be able to set the drag preview. As described before, each application can specify the type of content that enables the UI manager 215 to want to commandeer the drag session and accept the type of content, which is referred to herein as a policy driven drag destination.

The UI manager 215 sends a message to surrender the drag session to the drag and drop manager 210 in block 802. The drag and drop manager 210 receives the message in block 804, and in response, updates the routing policy to enable hit testing for the previous destinations where hit testing was disabled as previously discussed in FIG. 6. The drag and drop manager 210 sends a message to the event manager 220 to update the routing policy for the session, which the event manager 220 receives and then updates the routing policy for the drag session in block 806 to enable hit testing.

New detached events (e.g., new HID inputs) are received by the event manager 220 in block 808. In response, the event manager 220 forwards the new detached events to various destinations based on the updated routing policy. In the example of FIG. 8, the detached events are forwarded to the source application 430, the UI manager 215, and the destination application in block 810, block 812, and block 814.

In an implementation, the UI manager 215 can determine to re-commandeer a drag session based on a policy update and/or when an item is dragged into a particular region of the user interface, and can perform similar operations as described in FIG. 6 above.

Figure 9:
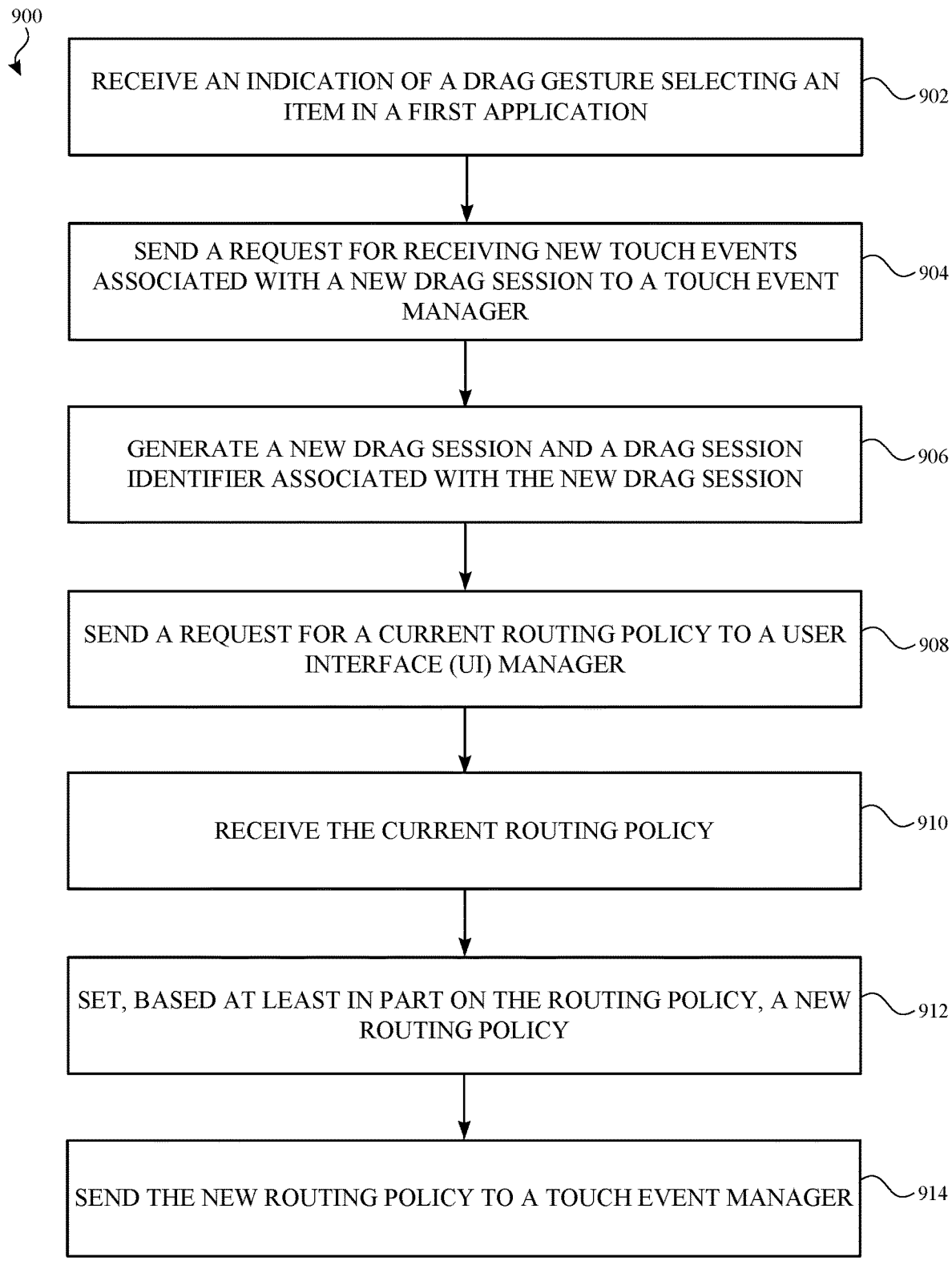
FIG. 9 illustrates a flow diagram of an example process for updating a routing policy for a new drag session in accordance with one or more implementations.

FIG. 9 illustrates a flow diagram of an example process 900 for updating a routing policy for a new drag session in accordance with one or more implementations in accordance with one or more implementations. For explanatory purposes, the process 900 is primarily described herein with reference to the electronic device 110 of FIG. 1, particularly with reference to the drag and drop manager 210 described above in FIG. 2. However, the process 900 is not limited to the electronic device 110 of FIG. 1, and one or more blocks (or operations) of the process 900 may be performed by one or more other components of other suitable devices. Further for explanatory purposes, the blocks of the process 900 are described herein as occurring in serial, or linearly. However, multiple blocks of the process 900 may occur in parallel. In addition, the blocks of the process 900 need not be performed in the order shown and/or one or more blocks of the process 900 need not be performed and/or can be replaced by other operations.

The drag and drop manager 210 receives an indication of a drag gesture selecting an item in a first application (902). The drag and drop manager 210, sends a request for receiving new events associated with a new drag session to an event manager (904). The drag and drop manager 210 generates a new drag session and a drag session identifier associated with the new drag session (906). The drag and drop manager 210 sends a request for a current routing policy to a user interface (UI) manager (908). The drag and drop manager 210 receives, from the UI manager, the current routing policy (910). The drag and drop manager 210 sets, based at least in part on the routing policy, a new routing policy (912). The drag and drop manager 210 sends the new routing policy to the event manager, where the event manager updates a respective routing policy for the new drag session based on the new routing policy (914).

As described above, one aspect of the present technology is the gathering and use of data available from specific and legitimate sources to improve the delivery to users of invitational content or any other content that may be of interest to them. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to deliver targeted content that may be of greater interest to the user in accordance with their preferences. Accordingly, use of such personal information data enables users to have greater control of the delivered content. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely block the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

Figure 10:
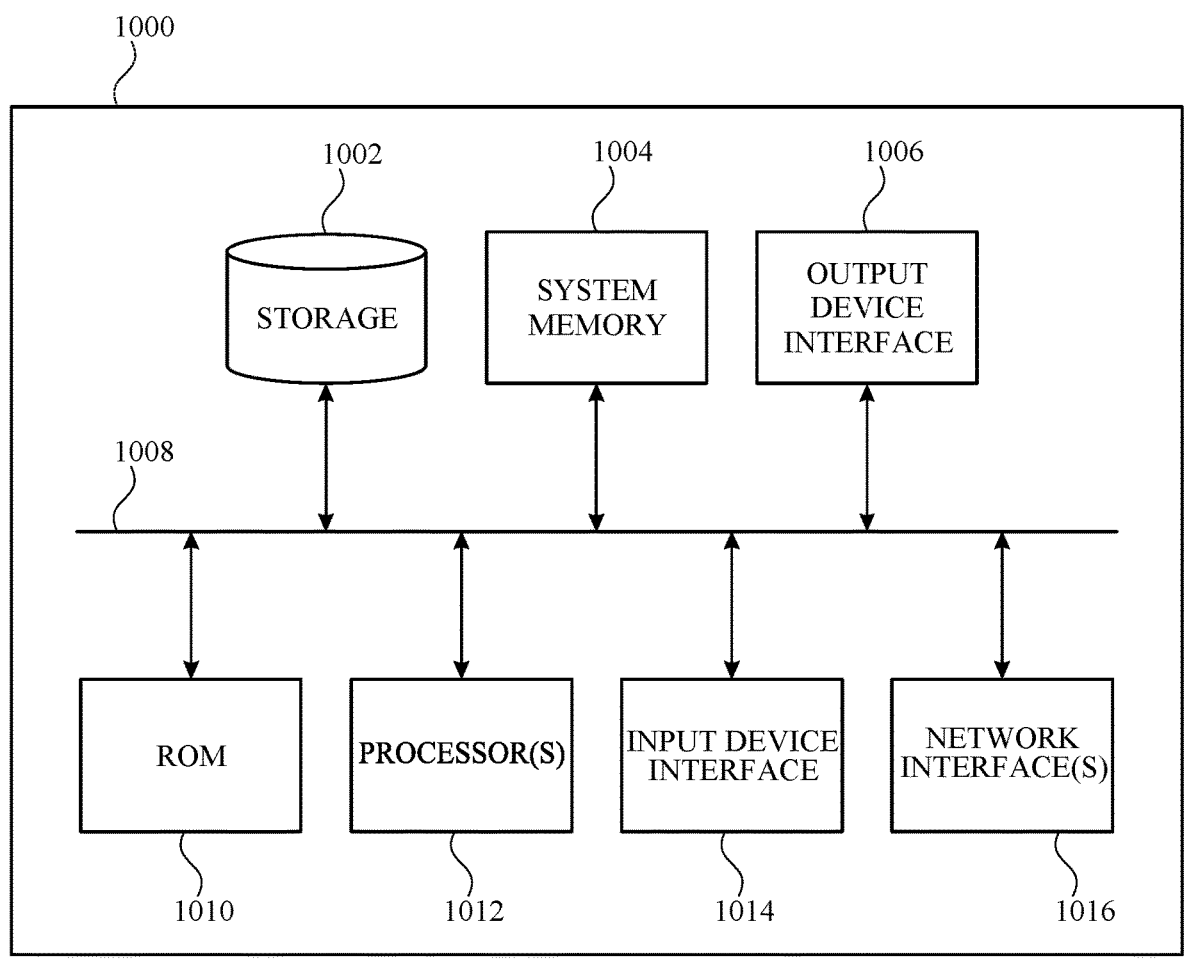
FIG. 10 illustrates an electronic system with which one or more implementations of the subject technology may be implemented.

FIG. 10 illustrates an electronic system 1000 with which one or more implementations of the subject technology may be implemented. The electronic system 1000 can be, and/or can be a part of, the electronic device 110, and/or the server 120 shown in FIG. 1. The electronic system 1000 may include various types of computer readable media and interfaces for various other types of computer readable media. The electronic system 1000 includes a bus 1008, one or more processing unit(s) 1012, a system memory 1004 (and/or buffer), a ROM 1010, a permanent storage device 1002, an input device interface 1014, an output device interface 1006, and one or more network interfaces 1016, or subsets and variations thereof.

The bus 1008 collectively represents all system, peripheral, and chipset buses that communicatively connect the numerous internal devices of the electronic system 1000. In one or more implementations, the bus 1008 communicatively connects the one or more processing unit(s) 1012 with the ROM 1010, the system memory 1004, and the permanent storage device 1002. From these various memory units, the one or more processing unit(s) 1012 retrieves instructions to execute and data to process in order to execute the processes of the subject disclosure. The one or more processing unit(s) 1012 can be a single processor or a multi-core processor in different implementations.

The ROM 1010 stores static data and instructions that are needed by the one or more processing unit(s) 1012 and other modules of the electronic system 1000. The permanent storage device 1002, on the other hand, may be a read-and-write memory device. The permanent storage device 1002 may be a non-volatile memory unit that stores instructions and data even when the electronic system 1000 is off. In one or more implementations, a mass-storage device (such as a magnetic or optical disk and its corresponding disk drive) may be used as the permanent storage device 1002.

In one or more implementations, a removable storage device (such as a floppy disk, flash drive, and its corresponding disk drive) may be used as the permanent storage device 1002. Like the permanent storage device 1002, the system memory 1004 may be a read-and-write memory device. However, unlike the permanent storage device 1002, the system memory 1004 may be a volatile read-and-write memory, such as random access memory. The system memory 1004 may store any of the instructions and data that one or more processing unit(s) 1012 may need at runtime. In one or more implementations, the processes of the subject disclosure are stored in the system memory 1004, the permanent storage device 1002, and/or the ROM 1010. From these various memory units, the one or more processing unit(s) 1012 retrieves instructions to execute and data to process in order to execute the processes of one or more implementations.

The bus 1008 also connects to the input and output device interfaces 1014 and 1006. The input device interface 1014 enables a user to communicate information and select commands to the electronic system 1000. Input devices that may be used with the input device interface 1014 may include, for example, alphanumeric keyboards and pointing devices (also called "cursor control devices"). The output device interface 1006 may enable, for example, the display of images generated by electronic system 1000. Output devices that may be used with the output device interface 1006 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 10, the bus 1008 also couples the electronic system 1000 to one or more networks and/or to one or more network nodes, such as the electronic device 110 shown in FIG. 1, through the one or more network interface(s) 1016. In this manner, the electronic system 1000 can be a part of a network of computers (such as a LAN, a wide area network ("WAN"), or an Intranet, or a network of networks, such as the Internet. Any or all components of the electronic system 1000 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device comprising;
a processor;
a memory device containing instructions, which when executed by the processor cause the processor to provide:
   a drag and drop manager configured to:
      manage a drag session corresponding to a drag event, the drag event including an initial input selecting an item in a window of a first application, a drag gesture moving the item to a particular region, and a release at an end of the drag gesture for dropping the item in the particular region; and
   a user interface (UI) manager configured to:
      send a request to commandeer the drag session to the drag and drop manager, wherein the request to commandeer the drag session disables hit testing for other applications;
      receive an indication that the release has occurred in the particular region; and
      perform a drop operation, wherein the drop operation includes at least one of opening a window of a second application for the item or opening another window of the first application for the item.

2. The device of claim 1, wherein the UI manager is further configured to:
   receive a request from the drag and drop manager for a routing policy for the drag event corresponding to the drag session, wherein the routing policy includes information indicating that the UI manager is to be a recipient of new drag HID events of the drag session; and
   send, in response to the request, the routing policy to the drag and drop manager.

3. The device of claim 2, wherein the processor is further configured to provide an event manager and the drag and drop manager is further configured to:
   receive the routing policy from the UI manager; and
   send a request to the event manager to update an existing routing policy for the drag session based on the received routing policy from the UI manager.

4. The device of claim 3, wherein the event manager is further configured to:
   receive the request from the drag and drop manager, and
   update the existing routing policy for the drag session based on the received routing policy by the drag and drop manager from the UI manager.

5. The device of claim 3, wherein the event manager is further configured to:
   receive a request from the drag and drop manager to generate a copy of the drag event in a form of a specialized drag event that coexists with the drag event to provide to the drag and drop manager, wherein the drag and drop manager is further configured to manage the specialized drag event and receive new drag HID events through the specialized drag event.

6. The device of claim 4, wherein the event manager is further configured to:
   send, based at least in part on the updated existing routing policy, the new drag HID events to the UI manager.

7. The device of claim 4, wherein the updated existing routing policy includes an identifier associated with the UI manager, the identifier indicating that the UI manager is to receive the new drag HID events of the drag session.

8. The device of claim 4, wherein the drag and drop manager is further configured to: receive a request from the UI manager to surrender the drag session; update the routing policy based on the request to surrender the drag session comprises enabling hit testing for the previously disabled other applications; and in response to the received request from the UI manager to surrender the drag session, sends a second request to the event manager to update the routing policy.

9. The device of claim 8, wherein the event manager is further configured to: receive the second request from the drag and drop manager, and perform another update of the routing policy based on the second request.

10. The device of claim 1, wherein the particular region comprises an area of the window of the first application or a window of a third application.

11. A method comprising: managing, by a drag and drop manager provided by a processor of a device, a drag session corresponding to a drag event, the drag event including an initial input selecting an item in a window of a first application, a drag gesture moving the item to a particular region, and a release at an end of the drag gesture for dropping the item in the particular region; and sending, by a user interface (UI) manager provided by the processor, a request to commandeer the drag session to the drag and drop manager, wherein the request to commandeer the drag session disables hit testing for other applications;

receiving, by the user interface manager, an indication that the release has occurred in the particular region; and performing, by the user interface manager, a drop operation, wherein the drop operation includes at least one of opening a window of a second application for the item or opening another window of the first application for the item.

12. The method of claim 11, further comprising: receiving, by the user interface manager, a request from the drag and drop manager for a routing policy for the drag event corresponding to the drag session, wherein the routing policy includes information indicating that the UI manager is to be a recipient of new drag HID events of the drag session; and sending, by the user interface manager and in response to the request, the routing policy to the drag and drop manager.

13. The method of claim 12, further comprising: providing an event manager by the processor, and receiving, by the drag and drop manager, the routing policy from the UI manager; and sending, by the drag and drop manager, a request to the event manager to update an existing routing policy for the drag session based on the received routing policy from the UI manager.

14. The method of claim 13, further comprising: receiving, by the event manager, the request from the drag and drop manager, and updating, by the event manager, the existing routing policy for the drag session based on the received routing policy by the drag and drop manager from the UI manager.

15. The method of claim 13, further comprising: receiving, by the event manager, a request from the drag and drop manager to generate a copy of the drag event in a form of a specialized drag event that coexists with the drag event to provide to the drag and drop manager, wherein the drag and drop manager is further configured to manage the specialized drag event and receive new drag HID events through the specialized drag event.

16. The method of claim 14, further comprising: sending, by the event manager and based at least in part on the updated existing routing policy, the new drag HID events to the UI manager.

17. The method of claim 14, wherein the updated existing routing policy includes an identifier associated with the UI manager, the identifier indicating that the UI manager is to receive the new drag HID events of the drag session.

18. The method of claim 14, further comprising: receiving, by the drag and drop manager, a request from the UI manager to surrender the drag session; updating, by the drag and drop manager, the routing policy based on the request to surrender the drag session comprising enabling hit testing for the previously disabled other applications; and in response to the received request from the UI manager to surrender the drag session, sending, by the drag and drop manager, a second request to the event manager to update the routing policy.

19. The method of claim 11, wherein the particular region comprises an area of the window of the first application or a window of a third application.

20. A non-transitory computer-readable medium comprising instructions, which when executed by a computing device, cause the computing device to perform operations comprising: receiving an indication, by a drag and drop manager, of a drag gesture selecting an item in a first application;

sending, by the drag and drop manager, a request for receiving new events associated with a new drag session to an event manager; generating, by the drag and drop manager, a new drag session and a drag session identifier associated with the new drag session; sending, by the drag and drop manager, a request for a current routing policy to a user interface (UI) manager;

receiving, from the UI manager, the current routing policy; the drab and drop manager setting, based at least in part on the current routing policy, a new routing policy; sending, by the drag and drop manager, the new routing policy to the event manager, wherein the event manager updates a routing policy for the new drag session based on the new routing policy.

21. The non-transitory computer-readable medium of claim 20, wherein the updated routing policy further includes
disabling hit testing for a particular application.

22. The non-transitory computer-readable medium of claim 20, wherein the event manager updates the routing policy for the new drag session such that the UI manager receives information for new inputs associated with the new drag session.

* * * * *

UNITED STATES PATENT AND TRADEMARK OFFICE
CERTIFICATE OF CORRECTION

PATENT NO. : 11,231,847 B2
APPLICATION NO. : 16/849876
DATED : January 25, 2022
INVENTOR(S) : Michael T. Turner et al.

It is certified that error appears in the above-identified patent and that said Letters Patent is hereby corrected as shown below:

In the Claims

Column 22, Line 33 (Claim 20): Replace "drab" with --drag--.

Signed and Sealed this
Twentieth Day of September, 2022

Katherine Kelly Vidal
*Director of the United States Patent and Trademark Office*